United States Patent [19]

Mikun

[11] 4,156,976
[45] Jun. 5, 1979

[54] GAME PLAYING APPARATUS

[76] Inventor: Norbert K. Mikun, 17527 Antonio Ave., Cerritos, Calif. 90701

[21] Appl. No.: 878,311

[22] Filed: Feb. 16, 1978

[51] Int. Cl.² .......................................... G09B 19/22
[52] U.S. Cl. .................................................... 35/8 R
[58] Field of Search ................. 35/8 R, 8 B, 9 E, 9 F, 35/75; 273/148 R

[56] References Cited

U.S. PATENT DOCUMENTS

| | | | |
|---|---|---|---|
| 2,124,941 | 7/1938 | Ellis | 35/8 B |
| 2,551,318 | 5/1951 | Drew | 35/8 R |
| 2,647,749 | 8/1953 | Wales | 35/8 R X |
| 2,984,914 | 5/1961 | Feigen et al. | 35/8 R |
| 3,013,349 | 12/1961 | Cooper | 35/8 B X |
| 3,048,403 | 8/1962 | Dubosque, Jr. | 35/8 R X |
| 3,097,435 | 7/1963 | Goldschmidt | 35/8 R |
| 3,395,463 | 8/1968 | Worden et al. | 35/8 R |
| 3,579,856 | 5/1971 | Way | 35/8 R |
| 3,628,259 | 12/1971 | Kahn | 35/9 E |

*Primary Examiner*—William H. Grieb
*Attorney, Agent, or Firm*—Blakely, Sokoloff, Taylor & Zafman

[57] ABSTRACT

Game playing apparatus whereby a single individual may play a complete game, such as chess or the like, during which each of the player's moves will automatically be evaluated, separate and apart from an ultimate win or loss determination. In the case of chess the apparatus accepts program cards defining the initial set-up of the board, and presenting a selection of distinctive move choices for each of a series of moves. The apparatus includes a scorekeeping device so that points associated with each move may be accumulated, from which points may be subtracted in accordance with incorrect moves selected by the player from among the plurality of distinctive move choices for that particular move. In that regard, selection of any of the plurality of move choices exposes the relative merit value of that choice for subtraction from the accumulated score, the selection of the ideal move providing the reply move by the apparatus. Other features of the apparatus are disclosed, such as a system for providing multiple levels of play from a single program card or set of program cards.

16 Claims, 3 Drawing Figures

GAME PLAYING APPARATUS

BACKGROUND OF THE INVENTION

1. Field of the Invention

The present invention relates to the field of game teaching and playing apparatus.

2. Prior Art

Numerous games requiring the play of two or more persons such as chess seem to have an almost perpetual popularity. In that regard, reference to chess herein is done only for exemplary purposes, as the preferred embodiment is in relation to the game of chess though, as shall subsequently be seen in greater detail, the apparatus of the present invention is very readily adaptable to other games wherein an individual player replies to the moves of one or more opponents with a move of his own selected from a large number of possible moves (checkers being but one example of other games of the same category). Further, the word "move" as used herein is used in the general sense to denote not only a physical move as a characteristic of the games of chess, checkers and the like, but to also denote any form of reply action, bid or strategy dependent upon the particular game in question. However, since the exemplary embodiment disclosed herein is in relation to the game of chess, the prior art described herein and the problems therewith will be described more specifically in relation to that game.

A great amount of information is available in book form relating to the game of chess. However, such materials are somewhat limited in their interest and effectiveness because they do not form or provide any "play action" for the reader, or provide any method of evaluating the reader in comparison to an assumed level of play for the reader. In order to attempt to provide the play action, various types of apparatus have been devised which will allow a solitary player to first select his move, and then compare his move to the proper or preferred move for the particular board condition. By way of example, a chess training aid and solitaire playing device is disclosed in U.S. Pat. No. 2,984,914. The person using this device, after carefully studying the arrangement of the chess pieces, will make his moves according to his best judgment. Then by referring to the device there will be indicated the best possible move under the circumstances, together with an indication of the reason for the particular move. However no relative merit between the best possible move under the circumstances and the move selected by the player is indicated, and no form of scorekeeping, particularly with respect to individual move selections, is provided. Accordingly the device simply presents generally the same type of information available in book form without providing any substantial play action. Similarly, in the chess machine of U.S. Pat. No. 3,395,463, apparatus is provided to allow the replaying of the games of the masters without reference to a book through the use of a program card used in conjunction with the chess machine, again merely allowing the sequencing of the machine through specific moves without comment or evaluation with respect to alternate moves the machine user might have chosen. Other devices of this same general type are shown in U.S. Pat. Nos. 2,647,749 and 3,579,856.

A still further example of the general type of device hereinbefore described is that of U.S. Pat. No. 2,551,318, that specific device utilizing a stack of program cards maintained below the board with each of the cards containing a board setting. Accordingly movement of the chess pieces is sequentially indicated by successive removal of the upper program card, exposing the card therebelow indicating the next board setting.

Other examples of amusement and/or educational devices of background interest are those shown in U.S. Pat. Nos. 3,048,403 and 3,097,435. However none of the prior art devices provide any apparatus for evaluation of alternate moves selected by a player, or the assessment of the relative merit of such alternative moves, particularly in a manner allowing the maintenance of a score as the game progresses. Also, obviously none of the prior art devices allow the use of a single set of program cards for play at various levels of skill.

BRIEF SUMMARY OF THE INVENTION

Game playing apparatus whereby a single individual may play a complete game, such as chess or the like, during which each of the player's moves will automatically be evaluated, separate and apart from an ultimate win or loss determination. In the case of chess the apparatus accepts program cards defining the initial set-up of the board, and presenting a selection of distinctive move choices for each of a series of moves. The apparatus includes a scorekeeping device so that points associated with each move may be accumulated, from which points may be subtracted in accordance with incorrect moves selected by the player from among the plurality of distinctive move choices for that particular move. In that regard, selection of any of the plurality of move choices exposes the relative merit value of that choice for subtraction from the accumulated score, the selection of the ideal move providing the reply move by the apparatus. Other features of the apparatus are disclosed, such as a system for providing multiple levels of play from a single program card or set of program cards. The preferred embodiment is assembled from die cut cardboard pieces using cement for the slide assemblies and edge retention for the stationary members.

DETAILED DESCRIPTION OF THE DRAWINGS

DETAILED DESCRIPTION

Figure 1:
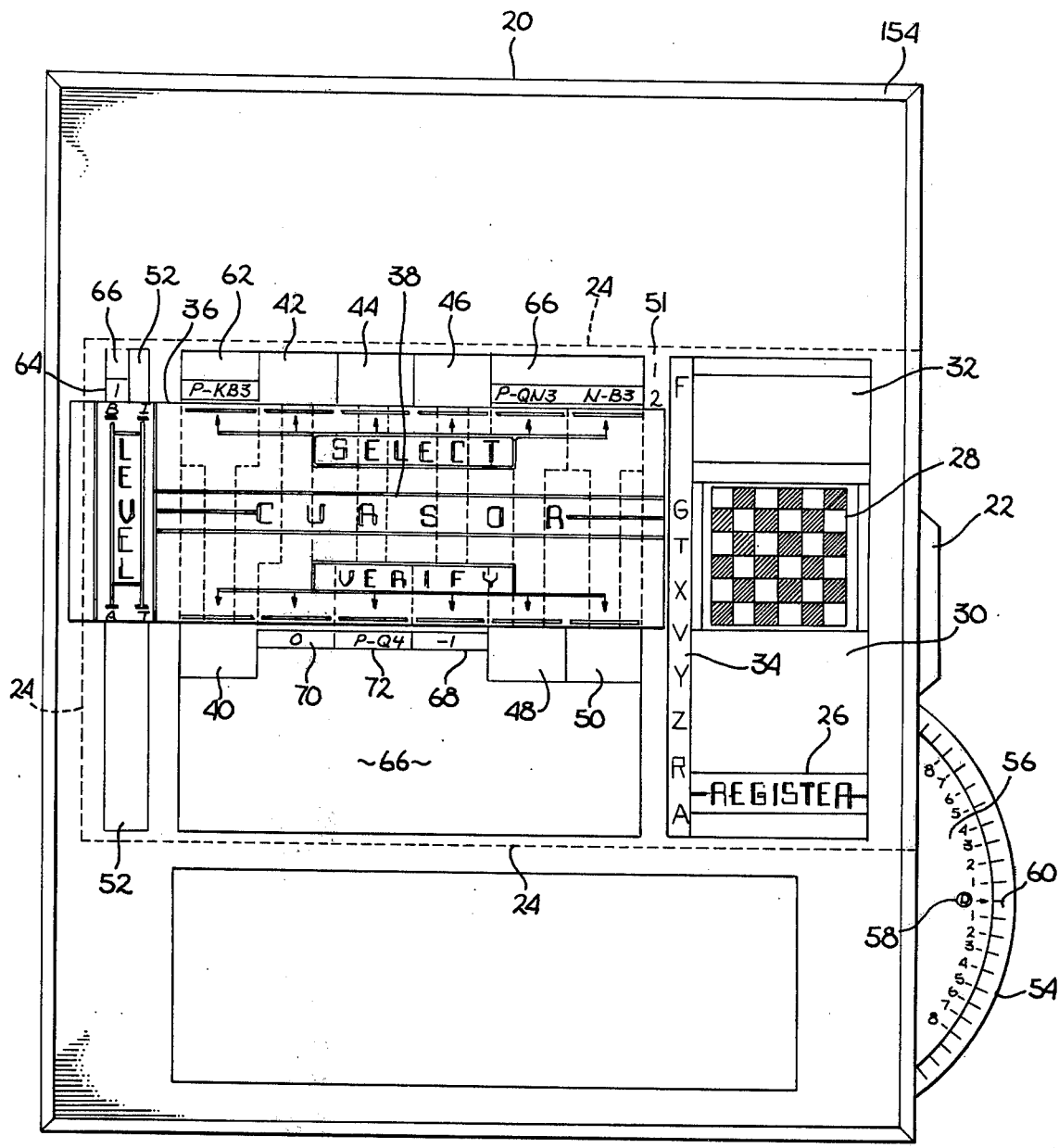
FIG. 1 is a face view of one embodiment of the present invention.

First referring to FIG. 1, a face view of the preferred embodiment of game playing apparatus in accordance with the present invention may be seen. This embodiment, as previously indicated, is directed toward the playing of the game of chess, and accordingly the description to follow shall be made directly applicable to that single game for greater specificity in the description of the illustrative embodiment. It should be understood however, that with only minor and obvious variation, particularly with respect to the printed matter used in cooperation with the apparatus of the present invention, the apparatus may be used for the playing of other games, such as checkers.

The apparatus 20 of the preferred embodiment of the present invention is comprised of an approximately rectangular board like structure formed by a plurality of carboard layers so as to provide a plurality of slides, each slideable in relation to a program card placed therein. In addition, at the lower right hand side thereof, there is a scorekeeping wheel allowing the net accumulation of points contributing to an overall win or loss. Thus, as may be seen in FIG. 1, a program card having a finger tab 22 has been inserted into the right side of the machine, the card generally having an outline indicated by the phantom lines 24, thereby covering substantially the entire central region of the device. The apparatus contains three main slide assemblies which are readily manipulated in an orderly fashion as the game progresses to direct a game in the desired manner. The first of the slide assemblies is at the right hand portion of the apparatus, and is moveable by manually sliding bar 26 marked "register" in a vertical direction. With the particular setting shown, the register bar 26 is in the lowermost position, and the game card or program card 22 is inserted with the first side of a new game facing upward. With the register in this position and with such a program card inserted, a miniature chess board 28 is exposed above the top of slide 30 (on which the bar 26 is mounted). The miniature chess board 28 has pictured thereon both white and black men indicating the initial setup of the chess game to be played. (Since the first few moves in the game of chess are often rather routine, the initial setup may indicate the representative state of the board after completing such routine initial moves.) Located thereabove in region 32 is a list of the ordered sequence of moves getting to the state of the board shown on the miniature board 28, thereby allowing the player the benefit of making these initial moves (for both black and white), with board verification being available on the board 28. Also of course, in region 32 there is indicated the color which the player will be playing for that game.

Adjacent the register bar 26 in region 34 is a series of vertically disposed stationary letters with which the register bar may be aligned. Alignment of the register bar with one of the upper letters will expose a printed instruction or conclusion through a viewing window in slide 30 located below the bar 26 (not visible in FIG. 1 because of the register bar being shown in the lowermost or setup position).

The second slide assembly is the generally rectangular cursor slide assembly 36 adjacent the slide 30 and extending over most of the remaining width of the apparatus 20. The cursor slide assembly 36 is slideable in the vertical direction by a cursor bar 38 conveniently disposed for manual manipulation. The third slide assembly is comprised of a plurality (in the preferred embodiment six) individual slides 40, 42, 44, 46, 48 and 50, each supported by the cursor slide assembly and vertically slideable with respect thereto.

Other major functional elements of the device 20 visible in FIG. 1 are the level of play selector and a scorekeeping member. The level of play selector comprises an elongated L-shaped member 52 visible primarily below the slide assembly 36, and to a lesser extent thereabove in FIG. 1. The L-shaped member, disposed below the cursor slide assembly 36, is removable, and by reorientation thereof may be used to cover three of four columns of numbers on a program card, which remaining selected column represents the level of play difficulty selected. In the position shown, the L-shaped member 52 is covering two adjacent vertical columns of numbers below the cursor slide assembly 36, and one vertical column of numbers thereabove, leaving exposed a single vertical column of numbers to the left of the upper portion of the L-shaped member. This in conjunction with the cursor slide assembly 36 provides for the sequential individual exposure of the numbers in the exposed column. Finally, the scorekeeping device comprises a rotating wheel 54 disposed in cooperative disposition with a stationary scale member 56, allowing the rotation of the wheel in a clockwise direction in accordance with the points allotted for the respective move, and counterclockwise in accordance with the number of points deducted as a result of incorrect move choices for each move. In addition there is a small opening 58 through which a letter imprinted on the rotating wheel 54 is visible, indicating the overall game status.

Figure 3:
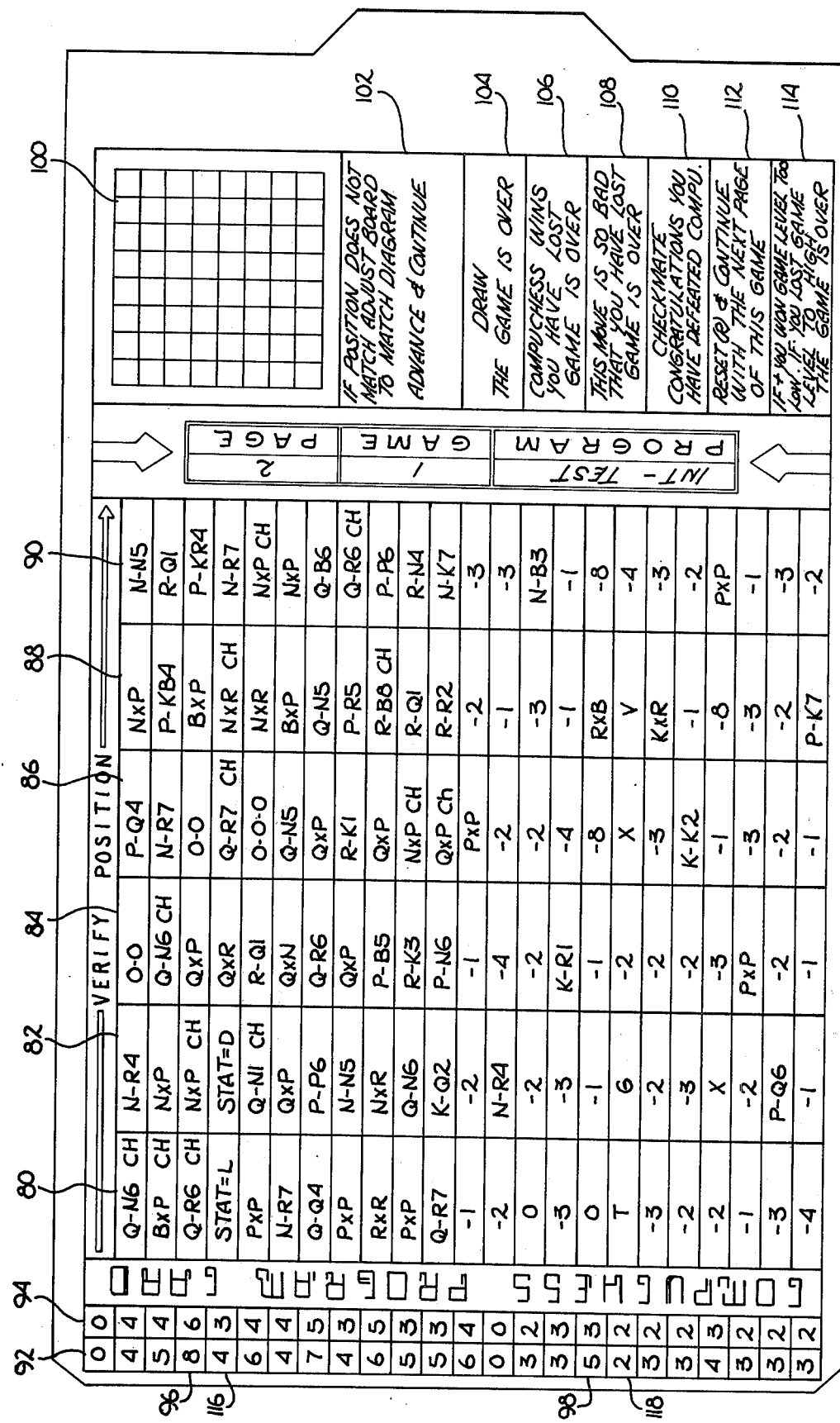
FIG. 3 is a face view of the second side of a typical program card.

Having now generally described the structure of the preferred embodiment, the manner of operation thereof will now be described, in part with the aid of FIG. 3 showing the second side (or a second) program card. In particular, the game begins by the setting of a reference mark 60 on wheel 54 to the initial or start position, sliding all of members 40, 42, 44, 46, 48 and 50 to the lower position (members 40, 48 and 50 being shown in the lower position and members 42, 44 and 46 being shown in the upper position in FIG. 1) and sliding the cursor slide assembly 36 to the uppermost position. Also, the L-shaped member 52 is placed in one of the four possible positions in accordance with the level of play difficulty desired. With the cursor slide assembly in its uppermost position, the program card is slid into position with the first or start side up. (The register slide is set to R initially, and for each new card.) In this condition to top row of the program card is viewable above the main body of the cursor slide assembly, which directs the user's attention to the initial series of moves identified in region 32 and the verification provided by way of the miniature game board 28. Thereafter the cursor slide assembly is moved downward one position so that panel 62 (also movable with the cursor slide assembly) covers the first line on the program card, exposing the second line of the program card between panel 62 and the slide assembly 36. This exposes a selection, namely six move choices, representing six possible player responses to the board setup. It also exposes a number in region 64 representing the points allotted for that move. It may readily be seen that if the L-shaped member 52 had been rotated 180° about its vertical axis prior to insertion, the upper portion thereof would have covered the number in region 64 but left exposed the number on the program card immediately to the right thereof. Similarly, since panel 66 also slides with the cursor slide assembly, rotation of the L-shaped member 52 180° about a horizontal axis would have covered both numbers above the cursor slide assembly but left uncovered the number immediately below the slide assembly, etc. Thus it may be seen that four selections are possible, the numbers representing generally different point assessments for each move corresponding to four different levels of play, e.g., beginner, intermediate, advanced and top player ratings.

For the first move the number in region 64 which is exposed is one, and accordingly the player rotates wheel 54 clockwise one increment. The player then selects one of the six possible moves in accordance with his belief as to which is the proper or best move of the choices presented. By way of example, if the move under slide 46, no longer visible than FIG. 1, was selected, the slide would be moved upward to the position shown uncovering in regions 68 therebelow the minus one, indicating that the move is not the correct move and indicating the relative lack of merit of the particular selection represented by the number of points to be deducted from the running total. Accordingly the player would then move wheel 54 counterclockwise one increment and then make another selection. Assuming the second selection is the move choice under slide 42 as shown in FIG. 1, the slide is moved upward to the position shown, exposing in region 70 thereunder the number zero. In effect, this indicates that this move choice is not the preferred move choice or the move choice on which the subsequent progression of the program card is based, but that in relative merit with respect thereto is equal or sufficiently close so as to not justify any penalty for its selection. (In some cases, a positive number such as +1 can also appear, indicating a move that is better than the move on which the game is based. The positive number, of course, is added on wheel 54.) Ultimately the proper choice of moves is that under the slide 44, exposing in region 72 the reply move of the board. Accordingly, after this first move the net points accumulated are zero with the game remaining a draw. Had a higher level of difficulty been chosen such as a top player level, zero points would have been awarded for the move, resulting in a net deficit of one point after the three move selections. (While two or more levels of play may be assessed the same number of points for a given move, appropriate distinctions between the levels of play will accumulate through a series of moves). For the second move, all six slides are moved to the lower position and the cursor slide assembly is moved to the next line to repeat the sequence.

Each game may progress to its ultimate conclusion (as subsequently described in detail) through the succession of moves in accordance with the sequence previously described. As an added feature, however, each selection of move choices is numbered by way of numbers in region 51 adjacent the letters in region 34 so that the numbers are successively uncovered by the cursor slide assembly as it is moved downward to indicate the number of the move choice selections exposed. This may be used in conjunction with an analysis test booklet for each program pack, wherein each move is referenced by game number, page number and move number. For each move so identified, the booklet lists all the move choices, and for each provides an analysis of the move.

Now referring to FIG. 3, the face view of the last side of a program card may be seen. This side of a typical card is very similar to the first side, generally described with respect to FIG. 1. Thus, in the main central area there are six individual columns 80, 82, 84, 86, 88 and 90, each containing in the upper portion thereof a move choice (together forming six possible move choices for each move, presented along a given line) and in the lower portion thereof presenting the point detriments and reply moves for the various move choices thereabove. It will be noted that there are eleven rows of move choices at the upper portion of the card, and twelve rows of reply moves and point detriments therebelow. Actually, in the preferred embodiment the lowermost row of move choices and the upper two rows of point detriments and reply moves are not utilized, as a result of the mechanical slide limitations of the device itself, so that only the first ten rows of move choices and the last ten rows of point detriments and reply moves associated therewith are used on each program card. The extra lines tend to breakup the visual organization of the card so as to avoid any quick mental impressions perhaps otherwise inadvertently gained by a quick scan of the card, since in the preferred embodiment the first line of move choices is not associated with the first line of point detriments and associated reply move, etc.

At the left of the card are two columns 92 and 94 which (neglecting the extra numbers provided) actually form two upper and two lower columns of points associated with each move, the points in each column being associated with a particular level of play selected. As previously mentioned, member 52 (FIG. 1) may be placed in position so that only one of the four columns will be exposed as a given game is played. Particularly exemplary of this feature are the point assessments located in row 96 and row 98, the four numbers appearing in the two rows representing four levels of difficulty selected by the position of member 52. These point assessments are for the third group of move choices representing possible point assessments of 8, 6, 5 and 3, representing the points given to the particular move for beginner, intermediate, advanced and top level play, the top level play giving the lowest point award, thereby minimizing the number of points which may be subtracted therefrom without achieving a net detriment for that move.

The upper righthand portion of the program card displays a small chess board presentation 100, illustrating the state of the board at the beginning of this portion of the game (e.g. representing the status of the board at the end of the previous side of play, to be used for verification purposes before proceeding with the play. In that regard a player may use this board sketch as the actual playing board.) Below the board 100 is a note 102 to that effect, with various additional notes being provided in the spaces 104, 106, 108, 110, 112 and 114 therebelow. Normally the notes in the spaces 104 through 114 are covered by the panel 30 in the register slide, though on certain occasions the player may be directed to move the register to a specified position exposing one of the specific notes. By way of example, for the fourth line of move choices 116 the corresponding point detriment and reply line 118 contains in the fourth column the letter "X" and in the fifth columns the letter "V". When the register 26 is set in the "X" position, the space 108 is exposed indicating that the move choice selected is so bad that the player has lost, whereas when the register is moved to the "V" position, space 110 is uncovered indicating that the player has won. The "X" outcome, it should be noted, is irrespective of the accummulated status from the past moves, except of course for the fact that the prior win or loss has not occurred. It will also be noted that in line 116 the first column contains the note "Stat=L", and the second column contains the note "Stat=D". Thus, before any move choice is made from the selections provided on line 116, the player must first note the letter that is displayed through the small window 58 on the scoring system, indicating a "W" (winning), an "L" (losing), or a "D" (draw). If an L is displayed the first slide 40 (FIG. 1) must be moved upward, exposing the T on line 118, thereby directing the player to move the register to the position T exposing space 106 indicating that the player has lost. If a D is displayed, slide 42 must be raised, exposing the letter G which, on movement of the register to that position, exposes region 104 indicating that the game was a draw. If on the other hand a W is exposed, either of the remaining four move choices presented may be selected, resulting in an instant loss (X) or the normal win (V) or possible point detriments. Note, however, that on line 118 there is no reply move of the board, indicating that for the group of associated move choices the game will end on this line as a result of the previously accummulated move scores (resulting in a T, G, X or V selection), the rest of the lines on the card being there only for continuity and appearance.

Having now described exemplary play progression and completion, a few play characteristics of the preferred embodiment will be described. In the preferred embodiment, the X rating can appear anywhere in the game, providing an instant loss due to an irrecoverable bad move, with the G, T & V ratings on the last card being the normal endings. The T rating will be always exposed if the player arrives at the end of a game with a status L showing as the cumulative result. The G rating will always be exposed if the player arrives at the end with a draw status.

If a player arrives at the end with a win (W) cumulative status, then he continues choosing until he exposes the V and thus wins.

(The fact that both an X and a V are showing on line 118 of FIG. 3 is coincidence. The X only happens to be there, though the V, G and T will always be there.)

There are 3 ways of losing, specifically:
1. By arriving at the end with an L status and losing via the STAT=L, T route.
2. By choosing an X rated move.
3. By playing at a level so below that selected for the machine, that the status dial will quickly move to the end of its counterclockwise range exposing a Y, which will cause a loss due to the fact that the difference in levels is too big.

There are 2 ways of winning:
1. By arriving at the end with a status of W and winning via the V route.
2. By setting the machine to play at a level much below that of the player, in which case the status dial will quickly reach its clockwise range end exposing a Z which will cause a win due to extreme level disparity.

There is no instant win comparable to the instant loss X.

There is only one way of drawing, and that is by arriving at the end with a D status and thus forcing the STAT=D, G sequence.

The V setting is always a checkmate or the machine's resignation on the last page. On all other pages the V merely instructs to continue with the next page. (Obviously, the number of pages in a game will vary.)

Figure 2:
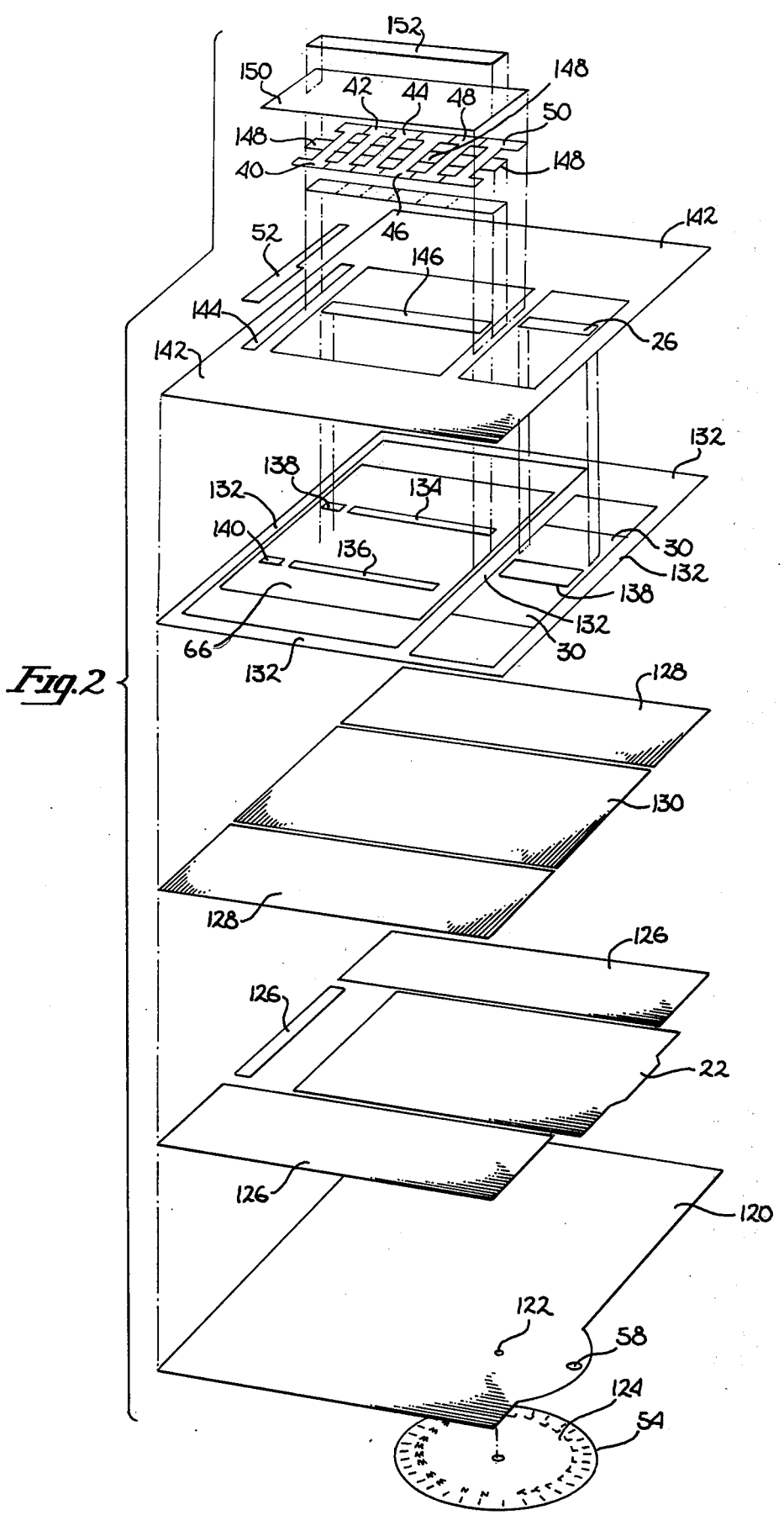
FIG. 2 is an exploded view showing the construction elements of the device of FIG. 1.

Now referring to FIG. 2, the basic component parts and their relative orientations to provide the play apparatus of FIG. 1, shown in an exploded view, may be seen. A basically solid base board 120 forms the bottom layer of the assembly, and is provided with a pivot point 122 to which the score wheel 54 is riveted so that the letter designations 124 ("L", "W" "Z", "Y" and "D") may be viewed through the window 58. Located thereabove are top, bottom and side spacer members 126, thereby defining a slot for the receipt of the program card 22. Immediately thereabove are additional spacer members 128 and 130, confining therebetween a clear plastic panel 130 for protection of the program card 22 from the various sliding members thereabove. Located still thereabove is a member 132 defining a large slide area at the left portion thereof for the main cursor slide assembly, and a somewhat smaller slide area at the right thereof for the register slide assembly. Located within the cursor slide region is a main cursor slide panel 66 having a longitudinal viewing window 134 to which one line of move selections may be viewed and a lower longitudinal window 136 through which the associated move detriments and reply moves may be viewed. Windows 138 and 140 each provide for the viewing of two move point assessments, only one of four point assessments being viewable as a result the selected position of member 52 thereabove. Also located within the register slide region of member 132 is a register slide panel 30 having a window 138 therein for the viewing of the various messages 104 through 114 on the program card (see FIG. 3).

The cursor slide panel 66 and the register slide panel 30 are each entrapped in their respective slide areas by a member 142 having cooperative openings somewhat smaller than the register slide panel 30 and the cursor slide member 66. Member 142 also has an opening 144 for receiving member 152 in any of four possible positions. Cemented to register slide panel 30 is a member 26 for manual manipulation of the register slide. Also a spacer member 146 is fastened to the cursor slide panel 66 with a plurality of further spacer members 148 being fastened thereabove for confining the move choice slides 40, 42, 44, 46, 48 and 50 (see also FIG. 1). These members in turn are confined at the top by a cover member 150 having the words select, verify etc., thereon (see FIG. 1), with a cursor finger member 152 coupled thereover for easy manual manipulation of a cursor slide assembly.

The various elements within a particular slide assembly which are fastened together, in the preferred embodiment, are so fastened by adhesive, with the main stationary board elements, specifically elements 120, 126, 128, 132 and 142 being coupled together along the top, bottom and left side and portions of the right side, leaving accessible the slot for receipt of program cards, by way of a U-shaped metal channel member 154 forming a clamping action over the edges of the assembly. As an alternate, or as an addition, the assembly may be taped along the edges to maintain the parts in the desired relative disposition. When assembled however, even only using tape, the stationary parts are relatively rigidly oriented with respect to each other, with the slide action being smooth but with a slight drag so as to be easily movable, though remaining in a set position until encouraged to any new position.

The preferred embodiment described in detail herein of course represents but one specific orientation and intercooperation of parts to provide the basic functional apparatus of the invention. The apparatus described provides a series of moves, each having a plurality of move choices, through a main cursor slide having thereon separate individual slide members to allow the selection of any possible move choices, with a scorekeeping apparatus being provided for the accummulation of points indicative of the relative merit or lack of merit of preceding move choices that were made. A separate slide assembly operative in conjunction with the main cursor slide assembly is provided to give separate instructions with respect to the outcome of the game or instructions for continued play, indexed through appropriate notations on program cards viewable under the individual slide members on the cursor slide assembly. Finally, a means is provided to adjust the level of play by selecting one of four possible levels of play by the appropriate disposition of a level of play determining member, so that the final combination described provides four possible levels of play with a given set of program cards (additional levels of play obviously being awardable through additional program cards). The play provided progresses in an orderly fashion, with the relative merit of the various move choices being immediately apparent to the player, and with the accummulation of a winning, draw or losing score being readily provided by the scorekeeping device. Ultimate outcome of the game with the apparatus provided may be dependent in total or in part upon the accummulated score, and/or upon the quality of an individual move independent of the previous moves made. Obviously, while a sepcific apparatus with one form of appropriate slide members, score keeping means, etc. has been disclosed, it will be obvious to those skilled in the art from the disclosure provided herein that various changes in form and detail may be made therein without departing from the spirit and scope of the invention.

I claim:

1. Game playing apparatus comprising:
   at least one program card having arranged thereon, in a logical order, a series of game play moves, each of the series of game play moves having associated with it a plurality of distinctive move choices, said program card further having a merit notation for each of said move choices indicative of the relative merit of each of the distinctive move choices within each of the game play moves;
   a frame structure for receiving each of said program cards in a predetermined orientation;
   first means coupled to said frame structure for sequentially exposing each plurality of distinctive move choices of each game play move without exposing the merit notations for any of the respective plurality of distinctive move choices; and
   second means coupled to said frame structure for selectively exposing individual merit notations each corresponding to one selected move choice from the plurality of distinctive move choices.

2. The apparatus of claim 1 wherein said at least one program card further has move point value associated with each game play move, said first means further being a means to expose the move point value associated with each game play move, and said frame structure further includes score keeping means for providing a cumulative indication of move point values and the relative merit of move choices made.

3. The apparatus of claim 1 wherein said at least one program card has a series of game play moves listed in a first direction down said program card, each of said series of game play moves having associated with it a plurality of distinctive move choices listed in a second direction across said program card, and wherein said first means comprises a first slide supported from said frame structure for sliding with respect to said frame structure in a direction corresponding with said first direction on said program card to sequentially expose the game play moves, and said second means comprises a plurality of second slides, each supported by said first slide and associated with a corresponding move choice and each being slideable with respect to said first slide to selectively cover and expose the associated merit notation for the associated move choice.

4. The apparatus of claim 3 wherein each of said second slides is slideable with respect to said first slide between a first position exposing an associated move choice and covering an associated merit notation, and a second position covering the associated move choice and exposing an associated merit notation.

5. The apparatus of claim 1 wherein said at least one program card further has a plurality of move point values associated with each game play move, said frame structure further having a third means for covering all but one of said move point values associated with each game play move.

6. The apparatus of claim 5 wherein said frame structure further includes scorekeeping means for providing a cumulative indication of move point values and the relative merit of move choices made.

7. The game playing apparatus of claim 1 wherein some of said merit notations on said at least one program card comprise reference indicia and wherein said program card further has a plurality of statements relative to the game being played, said frame structure further having third means coupled thereto for selectively exposing each of said statements as may be referenced by said reference indicia on said program card.

8. The apparatus of claim 1 wherein said first means further includes means for indicating a reference indicia for each plurality of distinctive move choices for referencing to a printed analysis for each of the respective move choices.

9. Game playing apparatus for use with program cards, each having arranged thereon a series of game play moves, each of the series of game play moves having associated with it a plurality of distinctive move choices, the program card further having a merit notation for each of said move choices indicative of the relative merit of each of the distinctive move choices within each of the game play moves, comprising:
   a frame structure for receiving each of said program cards in a predetermined orientation;
   first means coupled to said frame structure for sequentially exposing each plurality of distinctive move choices of each game play move without exposing the merit notations for any of the respective plurality of distinctive move choices; and
   second means coupled to said frame structure for selectively exposing individual merit notations each corresponding to one selected move choice from the plurality of distinctive move choices.

10. The apparatus of claim 9 for use with program cards further having a move point value associated with each game play move, wherein said first means further is a means to expose the move point value associated with each game play move, and said frame structure further includes score keeping means for providing a cumulative indication of move point values and the relative merit of move choices made.

11. The apparatus of claim 9 for use with program cards having a series of game play moves listed in a first direction down the program card, each of the series of game play moves having associated with it a plurality of distinctive move choices listed in a second direction across said program card, wherein said first means comprises a first slide supported from said frame structure for sliding with respect to said frame structure in a direction corresponding with said first direction on said program card to sequentially expose the game play moves, and said second means comprises a plurality of second slides, each supported by said first slide and associated with a corresponding move choice and each being slideable with respect to said first slide to selectively cover and expose the associated merit notation for the associated move choices.

12. The apparatus of claim 11 wherein each of said second slides is slideable with respect to said first slide between a first position exposing an associated move choice and covering an associated merit notation, and a second position covering the associated move choice and exposing an associated merit notation.

13. The apparatus of claim 9 for use with program cards further having a plurality of move point values associated with each game play move, wherein said frame structure further has a third means for covering all but one of said move point values associated with each game play move.

14. The apparatus of claim 13 wherein said frame structure further includes scorekeeping means for providing a cumulative indication of move point values and the relative merit of move choices made.

15. The game playing apparatus of claim 9 for use with program cards wherein some of said merit notations comprise reference indicia and wherein the program cards have a plurality of statements relative to the game being played, said frame structure further having third means coupled thereto for selectively exposing each of said statements as may be referenced by said reference indicia on said program card.

16. The apparatus of claim 9 wherein said first means further includes means for indicating a reference indicia for each plurality of distinctive move choices for referencing to a printed analysis for each of the respective move choices.

* * * * *